Patented Apr. 21, 1931

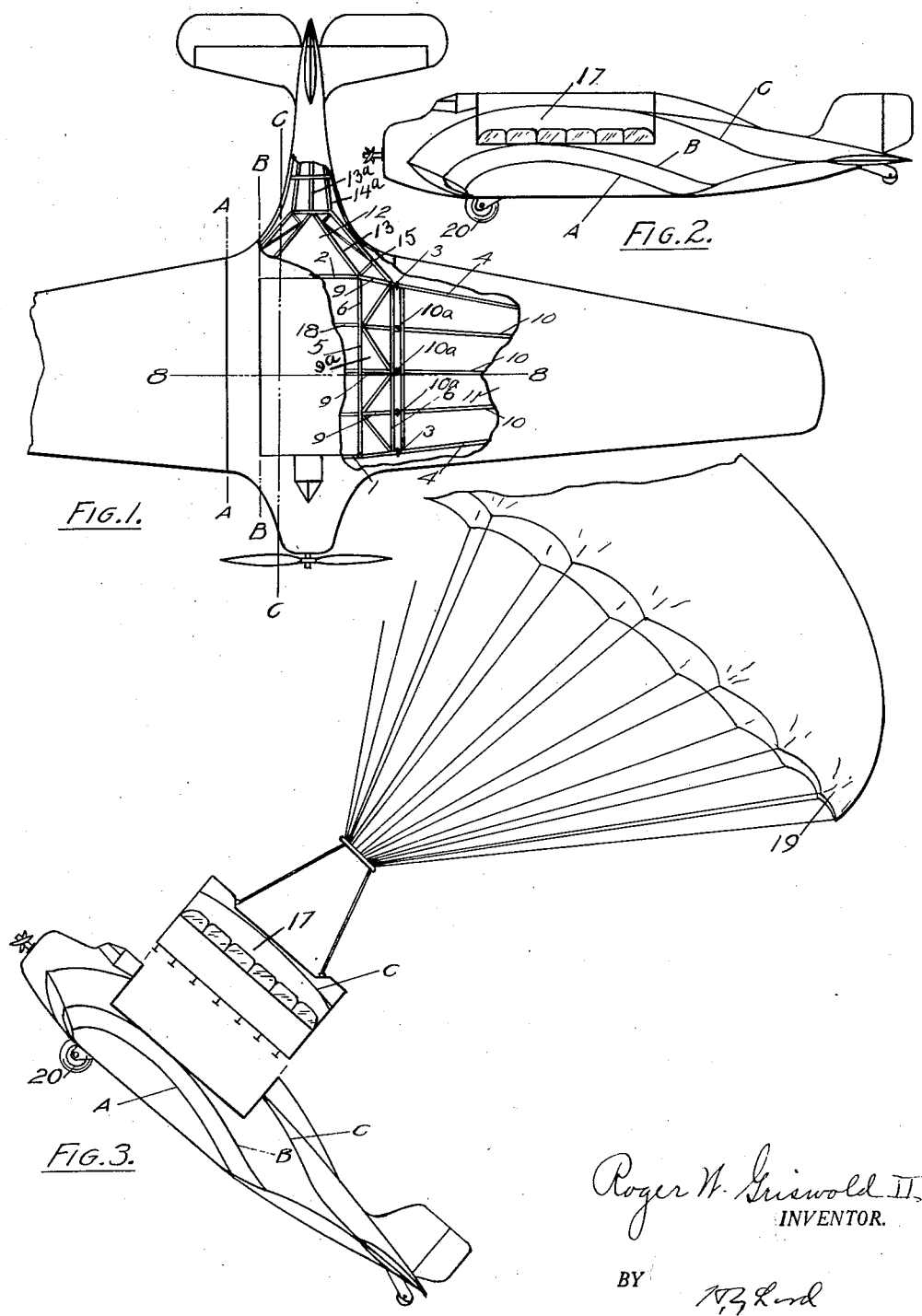

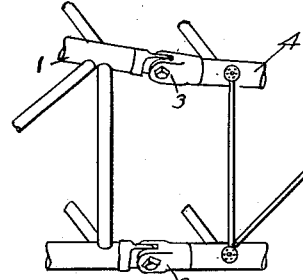
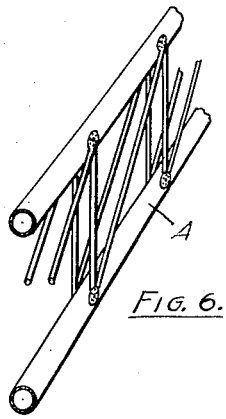
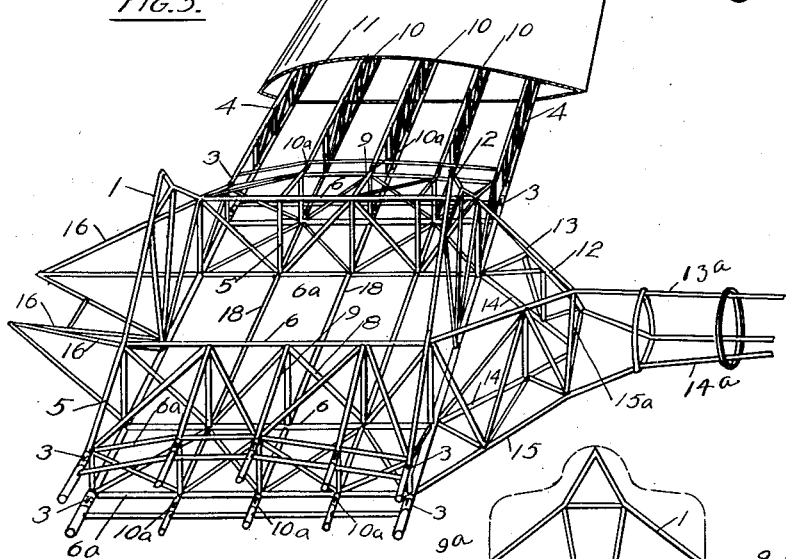
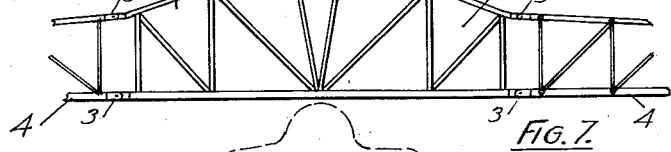
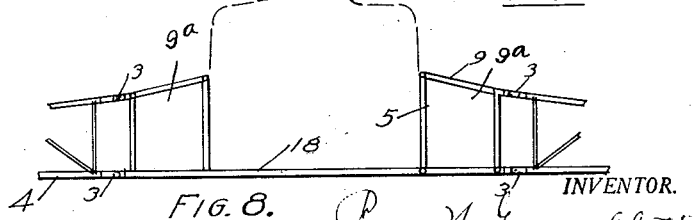

1,801,344

UNITED STATES PATENT OFFICE

ROGER W. GRISWOLD, 2D, OF HUNTINGTON, NEW YORK

AEROPLANE

Application filed February 19, 1929. Serial No. 341,087.

Aeroplanes as at present made, particularly in monoplane structures, have the planes arranged above, or below the cabin or cock pit. This is particularly true where the planes are of the full cantilever type, that is to say, in which the wing spars within the wings form the entire support for the wings. This construction results in a compromise as to the depth of the truss structure forming the wing support. There have been monoplane structures made in which the wing supports are arranged at the top of the cabin, or cock pit and exposed struts, or braces are extended from the bottom of the cabin or cock pit to the wings, these struts, or supports being outside of the wing structure. Even these involve a weakness with relation to the intervening space between these struts. The present invention involves a full cantilever structure in which the levers are arranged at the ends of the cabin space and therefore may be of a depth equal to the cabin depth. It also involves a continuation of these trusses in the wing structure. It also involves so bracing the sides of the cabin space between the fore and aft trusses so as to carry intervening spars, the strain from such intervening spars being communicated through these side frames to the end trusses. The invention also involves a connection between such side braced frames and the tail and nose structure giving them a continuity with an uninterrupted cabin space. The invention also involves a forming of the fuselage so as to leave the cabin space open at the top. This makes it possible to readily assemble the cabin, substituting one type of cabin for another and also for providing safety devices in the way of a parachute by which the cabin may be readily detached from the fuselage and thus handled as a safety device independently of the plane as a whole. Features and details of the invention will appear from the specification and claims.

A preferred embodiment of the invention is illustrated in the accompanying drawings as follows:—

Fig. 1 shows a plan view of the aeroplane, a part of the skin being broken away to better show construction.

Fig. 2 a side elevation of the same.

Fig. 3 a side elevation showing the cabin partly detached.

Fig. 4 a perspective view of the fuselage and wing frames.

Fig. 5 a detached view of the joint connection between the fuselage and wing structure.

Fig. 6 an enlarged view of the spar structure.

Fig. 7 an enlarged end view of one of the end trusses of the fuselage and wing structure.

Fig. 8 a section on the line 8—8 in Fig. 1.

1 marks the front cantilever truss frame and 2 the rear cantilever truss frames. These end frames form the ends of the cabin space in the fuselage and are preferably extended some distance each side of the cabin space and are connected by joints 3 with the wing spars 4, the top and bottom longérons of the trusses 1 and the spars extending through the joints and making a continuous truss frame. It will be noted that this truss frame, or cantilever being only at the ends of the cabin can be made of the full depth of the cabin at the center, the contour of the cabin being shown in dash lines in Figs. 7 and 8. This gives a very rugged construction and one that may be of comparatively easy fabrication. The spars 4 may be of any preferred truss form having the top and bottom longérons connected by braces and struts in the usual manner, as clearly shown in Fig. 6.

Arranged each side of the cabin space and connecting trusses 1 and 2 are side frames 5. These side frames are of box form. The box frames have the top and bottom longéron members 6 and 6a, the top longérons 6 and 6a being connected by similar struts and braces, and the bottom longérons 6 and 6a being also connected by proper struts and braces, these struts and braces being indicated as 8 and 9 forming what I have termed a box girder 9a. Intermediate wing spars 10, similar in form to the spars 4 are connected to the box girders by joints 10a, the joints 10a being in alinement with struts extending from the longéron 6 to the longéron 6a so that the longérons of the spars are connected into the box girder and the box girder communicates the strains sustained by these intermediate spars to the deep and relatively heavy end trusses. The spars are connected by the skin 11 of the wings, this skin forming the cross member between these spars.

A triangular truss 12 is connected to the rear of the box girders and is connected into the tail structure, the top and bottom longérons 13 and 14 of the triangular truss being connected into the top and bottom longérons 13a and 14a respectively of the tail. These top and bottom longérons connect with the end truss at the inner edges of the box frame and are connected together by proper struts and braces and there are also members 15 extending from the bottom outer edge of the box girder to the longérons of the tail piece, which connected with the upper triangular portion forms a cross triangular truss 15a. This gives a very rigid tail construction in which the longérons of the truss structure are carried into the side frames of the box girder and again gives rigidity and strength, particularly because of the depth of the triangular truss 12, this being of ample depth because it may be of the depth of the cabin space without adding to the resistance.

The nose frame has longérons 16 extending forwardly from the top and bottom longérons 6 of the side frames and these are brought together at the front end and are cross braced with struts and braces so as to form a truss frame at the front of the cabin space, the trusses of which can at their bases at least have a depth ample to give great rigidity with lightness, the depth of the cabin space permitting of such wide bases.

The cabin 17 may be of any desired formation and is simply mounted in the cabin space, the cabin space having cross members 18 in continuation of the lower longérons of the intermediate spars. This manner of mounting the cabin makes a very simple assembly structure, also one in which the cabins may be readily interchanged, and one in which there is a possibility of a safety element by the connection of a parachute 19 directly to the cabin on the release of which the cabin will be detached from the fuselage as indicated in Fig. 3. The parachute will then only be subjected to the load of the cabin and its occupants.

I have shown in Fig. 2 a side elevation of the structure of the aeroplane on which I have indicated the wing formation on the sections A, B, and C as these lines are indicated in Figs. 1, 2 and 3.

With this structure I have set the cabin space into the wing level in a full cantilever type of plane. This makes it possible to make a very deep truss without adding to the resistance that must be encountered incident to the cabin space. The box girders communicate the strains of the intermediate spars to this wide end truss, particularly the strains of the longérons, the lower longérons being carried through under the cabin. This structure permits also, as it will be noted, of readily leaving the cabin space open both for convenience of assembly and for the safety feature. The box structures at the sides give such rigidity as to make possible the ready attachment through truss formation of the tail and nose structures.

The wheel support 20 ordinarily is directly under the front truss and, therefore, the structure is best adapted to take the shocks from the wheel structure.

What I claim as new is:—

1. In an aeroplane, the combination of a truss wing and fuselage structure having a cabin space free from cross obstructions throughout the major portion of the width of the wing comprising cantilever truss frames extending across the ends of the cabin space and continued in truss frame spars within the wings.

2. In an aeroplane, the combination of a truss wing and fuselage structure having a cabin space free from cross obstructions throughout the major portion of the width of the wing comprising cantilever truss frames extending across the ends of the cabin space and continued in truss frame spars within the wings, said end truss frames extending in height a major portion of the height of the cabin space.

3. In an aeroplane, the combination of a truss wing and fuselage structure having a cabin space free from cross obstructions throughout the major portion of the width of the wing comprising cantilever truss frames extending across the ends of the cabin space and continued in truss frame spars within the wings, the end trusses extending substantially the height of the cabin space.

4. In an aeroplane, the combination of a truss wing and fuselage structure having a cabin space free from cross obstructions throughout the major portion of the width of the wing comprising cantilever truss frames extending across the ends of the cabin space and continued in truss frame spars within the wings; truss side frames connecting the end frames extending along the sides of the cabin space; and truss frame spars extending from the side frames within the wings intermediate the first-mentioned spars.

5. In an aeroplane, the combination of a truss wing and fuselage structure having a cabin space free from cross obstructions throughout the major portion of the width of the wing comprising cantilever truss frames extending across the ends of the cabin space and continued in truss frame spars within the wings; truss side frames connecting the end frames extending along the sides of the cabin space; and truss frame spars extending from the side frames within the wings intermediate the first-mentioned spars, said side frames being of box formation.

6. In an aeroplane, the combination of a full cantilever wing structure and fuselage in which the cabin space is between the wings and is free from cross obstruction throughout the major portion of the width of the wings.

7. In an aeroplane, the combination of a full cantilever wing structure and fuselage in which the cabin space is between the wings and extends through the wing levels and is free from cross obstruction throughout the major portion of the width of the wings.

8. In an aeroplane, the combination of a full cantilever wing structure and fuselage in which the cabin space is between the wings and is free from cross obstruction throughout the major portion of the width of the wings, said space being open at the top.

9. In an aeroplane, the combination of a full cantilever wing structure and fuselage in which the cabin space is between the wings and extends through the wing levels and is free from cross obstruction throughout the major portion of the width of the wings, said space being open at the top.

10. In an aeroplane, the combination of a truss wing and fuselage structure having a cabin space free from cross obstructions throughout the major portion of the width of the wing comprising cantilever truss frames extending across the ends of the cabin space and continued in truss frame spars within the wings, said cabin space being open at the top.

11. In an aeroplane, the combination of a truss wing and fuselage structure having a cabin space free from cross obstructions throughout the major portion of the width of the wing comprising cantilever truss frames extending across the ends of the cabin space and continued in truss frame spars within the wings, said cabin space being open at the top; and a detachable cabin arranged in the space.

12. In an aeroplane, the combination of a truss wing and fuselage structure having a cabin space free from cross obstructions throughout the major portion of the width of the wing comprising cantilever truss frames extending across the ends of the cabin space and continued in truss frame spars within the wings; truss side frames connecting the end frames extending along the sides of the cabin space; and truss frame spars extending from the side frames within the wings intermediate the first-mentioned spars, said cabin space being open at the top.

13. In an aeroplane, the combination of a truss wing and fuselage structure having a cabin space free from cross obstructions throughout the major portion of the width of the wing comprising cantilever truss frames extending across the ends of the cabin space and continued in truss frame spars within the wings; truss side frames connecting the end frames extending along the sides of the cabin space; truss frame spars extending from the side frames within the wings intermediate the first-mentioned spars, said cabin space being open at the top; and a cabin detachably secured in the cabin space.

14. In an aeroplane, the combination of a fuselage having end trusses forming the centers of cantilevers; box frames connecting the end trusses and forming between the end frames and side frames a cabin space open at the top; wing spars, two of which are in alinement and in continuation with the end trusses and others of which are connected with the box girders; and a cabin detachably mounted in the cabin space.

15. In an aeroplane, the combination of a truss wing and fuselage structure having a cabin space free from cross obstructions throughout the major portion of the width of the wing comprising cantilever truss frames extending across the ends of the cabin space and continued in truss frame spars within the wings; truss side frames connecting the end frames extending along the sides of the cabin space; truss frame spars extending from the side frames within the wings intermediate the first-mentioned spars; and a tail frame comprising a truss frame connected with the side frames.

16. In an aeroplane, the combination of a truss wing and fuselage structure having a cabin space comprising cantilever truss frames extending across the ends of the cabin space and continued in truss frame spars within the wings; truss side frames connecting the end frames extending along the sides of the cabin space; truss frame spars extending from the side frames within the wings intermediate the first-mentioned spars; a triangular truss frame connected with the side frames; and a tail frame connected with the triangular truss frame, the longérons of the side frame, triangular truss frame and tail frame being continuous.

17. In an aeroplane, the combination of a truss wing and fuselage structure having a cabin space comprising cantilever truss frames extending across the ends of the cabin space and continued in truss frame spars within the wings; truss side frames connecting the end frames extending along the sides of the cabin space; truss frame spars extending from the side frames within the wings intermediate the first-mentioned spars, said side frames being of box formation; a triangular truss frame at the rear of the box frames, the longérons of the top and bottom of the triangular frame connecting with the top and bottom longérons of the inner sides of the box frames and connecting at their rear, the lower outer longérons of the box frame being extended by longérons in the triangular frame; a triangular sub-tail frame connecting longérons of the triangular connecting frame at the rear; and a tail frame having its longérons connected with the connecting frame at the rear ends of the longérons of the connecting frame.

18. In an aeroplane, the combination of a truss wing and fuselage structure having a cabin space comprising cantilever truss frames extending across the ends of the cabin space and continued in truss frame spars within the wings; truss side frames connecting the end frames extending along the sides of the cabin space; truss frame spars extending from the side frames within the wings intermediate the first-mentioned spars; a triangular connecting frame at the rear of the side frames; a tail frame extending from the triangular connecting frame; and a nose frame extending to the front of the side frames.

19. In an aeroplane, the combination of a truss wing and fuselage structure having a cabin space comprising cantilever truss frames extending across the ends of the cabin space and continued in truss frame spars within the wings; truss side frames connecting the end frames extending along the sides of the cabin space; truss frame spars extending from the side frames within the wings intermediate the first-mentioned spars; a triangular connecting frame at the rear of the side frames; a tail frame extending from the triangular connecting frame; and a nose frame extending to the front of the side frames, the longérons of the side frames being extended into the nose frame and through the connecting frame into the tail frame.

In testimony whereof I have hereunto set my hand.

ROGER W. GRISWOLD, II.